United States Patent
Yao et al.

(10) Patent No.: US 6,710,093 B2
(45) Date of Patent: Mar. 23, 2004

(54) IMMOBILIZED ION EXCHANGE MATERIALS AND PROCESSES FOR MAKING THE SAME

(75) Inventors: Li Yao, Peachtree City, GA (US); George W. Greene, IV, Peachtree City, GA (US); Michael Gerald Arthur, Douglasville, GA (US)

(73) Assignee: Porex Corporation, Fairburn, GA (US)

( * ) Notice: Subject to any disclaimer, the term of this patent is extended or adjusted under 35 U.S.C. 154(b) by 0 days.

(21) Appl. No.: 10/226,235

(22) Filed: Aug. 23, 2002

(65) Prior Publication Data

US 2003/0062311 A1 Apr. 3, 2003

Related U.S. Application Data

(62) Division of application No. 09/447,654, filed on Nov. 23, 1999, now abandoned.

(51) Int. Cl.[7] ................................................. C08J 5/20
(52) U.S. Cl. ......................................... 521/27; 521/28
(58) Field of Search ..................................... 521/27, 28

(56) References Cited

U.S. PATENT DOCUMENTS 3,248,339 A * 4/1966 Spes

FOREIGN PATENT DOCUMENTS

EP         659 482 A1  *  6/1995

OTHER PUBLICATIONS

Helfferich, Ion Exchange, (1962) 35,36,59,60,309, McGraw–Hill (New York).*
Odian, Principles of Polymerization, 3 rd Edition (1991) Wiley (New York).*

* cited by examiner

*Primary Examiner*—Bernard Lipman
(74) *Attorney, Agent, or Firm*—Pennie and Edmonds LLP

(57) ABSTRACT

This invention relates to processes for immobilizing ion exchange particles, and to the products of those process. One embodiment of the invention encompasses a process of immobilizing ion exchange particles within a porous polyolefinic material. A second embodiment encompasses a process of immobilizing ion exchange particles within a hydrogel. Preferred hydrogels are comprised of polyvinyl alcohol.

10 Claims, No Drawings

IMMOBILIZED ION EXCHANGE MATERIALS AND PROCESSES FOR MAKING THE SAME

This is a divisional of U.S. patent application Ser. No. 09/447,654, filed Nov. 23, 1999, now abandoned, the entirety of which is incorporated herein by reference.

1. FIELD OF THE INVENTION

This invention relates to processes for immobilizing ion exchange particles within porous materials, and the products of those processes.

2. BACKGROUND OF THE INVENTION

The exchange of ions in solution with those bound to an insoluble solid—a process referred to as "ion exchange"—has numerous applications in industry, research, and medicine. Examples of applications include, but are not limited to, water softening, chromatography, natural product purification, metal recovery, and blood filtration. The insoluble solid materials typically used in ion exchange applications consist, comprise, or are made from ion exchange resins, which are typically functionalized porous polymeric materials. The functional groups bound to the surfaces and interiors of these materials are, or contain, an ionic moiety that can exchange with a solvated ion with which it comes in contact.

The chemical composition, form, and size of an insoluble solid used for ion exchange depends upon the particular ion exchange application. For example, U.S. Pat. Nos. 5,080,646 and 5,147,296 disclose porous membranes made from ethylene vinyl acetate (EVA) and ion exchange resin. The membranes, which are allegedly useful in some drug delivery applications, are formed using melt processing or solvent casting. U.S. Pat. No. 5,169,383 discloses an ion exchange membrane which is also made using melt processing or solvent casting.

A number of other ion exchange membranes have been disclosed. For example, U.S. Pat. No. 5,346,924 discloses a membrane made by heating, under pressure, granules or pellets of ion exchange resin and a binder. The binder is either linear low density polyethylene or high molecular weight polyethylene. U.S. Pat. No. 5,531,899 also discloses an ion exchange membrane made from high molecular weight polyethylene and ion exchange particles (i.e., particles of ion exchange resin). The membrane is formed by mixing the polyethylene with a porogen (diluent), heating the mixture, adding ion exchange particles, and forming, shaping, and quenching the final product.

Ion exchange resins have also been incorporated into non-membrane materials. For example, an epoxy ion exchange resin was reportedly adhered to a layer of EVA on a silica substrate. Chanda, M. and Rempel, G. L., *Chem. Engin. Sci.* 54:3723–3733 (1999). In most applications, however, ion exchange resin is simply poured into a column through which solutions can be passed. Although simple, this approach can be inefficient. One source of inefficiency is the formation of channels through the resin or along the walls of the column. Once such channels have formed, solutions passed through the column will avoid the bulk of the resin. It is thus desirable to immobilize particles of ion exchange resin in a porous solid through which solutions can pass.

Until this invention, the need for a process that can immobilize ion exchange resin has not been adequately met. In particular, processes such as those used to prepare typical ion exchange membranes allow little control over the porosity, ion exchange efficiency, and strength of the resulting ion exchange material. For example, methods that comprise melt processing can leave individual particles or even large chunks of ion exchange resin entirely coated with the polymers used to immobilize them, thereby rendering these pieces of resin useless. Conventional processes used to immobilize particles of ion exchange resin further do not allow the facile immobilization of resins that decompose at high temperatures. Consequently, new processes of immobilizing of ion exchange particles are desired, as are the products of those processes.

3. SUMMARY OF THE INVENTION

A first embodiment of the invention encompasses a process for immobilizing ion exchange particles in a polyolefin matrix. This method comprises sintering a mixture comprised of ion exchange and polyolefin particles, wherein the polyolefin particles are substantially spherical. Preferably, a substantial portion of the ion exchange particles do not decompose during the sintering.

In a preferred embodiment, the average size of the polyolefin particles is about the same as the average size of the ion exchange particles.

In a preferred embodiment, the polyolefin particles are thermal fined. In another preferred embodiment, the polyolefin particles are made using underwater pelletizing.

In another preferred embodiment, the mixture of particles is comprised of from about 90 to about 30 weight percent, more preferably from about 70 to about 40 weight percent, and most preferably from about 60 to about 50 weight percent ion exchange particles.

In another preferred embodiment, the polyolefin has a melting temperature that is less than the degradation temperature of the ion exchange resin. In a more preferred embodiment, the polyolefin has a melting temperature of less than about 125° C., more preferably less than about 115° C., and most preferably less than about 105° C.

In another preferred embodiment, the polyolefin has a melt-flow index of from about 10 to about 0.5, more preferably from about 8 to about 0.5, and most preferably from about 3 to about 1.

In another preferred embodiment, the polyolefin is selected from the group consisting of, but not limited to: ethylene vinyl acetate; ethylene methyl acrylate; polyethylenes such as, but not limited to, low density polyethylene, linear low density polyethylene, high density polyethylenes, and ultra-high molecular weight polyethylene; polypropylenes; ethylene-propylene rubbers; ethylene-propylene-diene rubbers; and mixtures and derivatives thereof. In a more preferred embodiment, the polyolefin is ethylene vinyl acetate comprising from about 30 to about 2, more preferably from about 20 to about 5, and most preferably from about 15 to about 6 weight percent vinyl acetate.

In a specific preferred embodiment, the polyolefin particles are ethylene vinyl acetate particles and the mixture is sintered at a temperature of from about 120° C. to about 75° C., more preferably from about 110° C. to about 80° C., and most preferably from about 100° C. to about 95° C. The sintering can optionally be conducted under pressure; preferred pressures are from about 1 psi to about 10 psi.

In another preferred embodiment, the mixture comprised of ion exchange and polyolefin particles further comprises a filler. Specific fillers include, but are not limited to, carbon black, cellulose fiber powder, siliceous fillers, polyethylene fibers and filaments, and mixtures thereof.

A second embodiment of the invention encompasses a process of immobilizing ion exchange particles in a hydrogel. This process comprises the formation of a mixture comprised of a solvent, ion exchange particles, and a material capable of forming a hydrogel, and heating and cooling the mixture under conditions sufficient to form a physically crosslinked hydrogel.

In a preferred embodiment, the mixture is comprised of from about 97 to about 60 weight percent, more preferably from about 96 to about 80 weight percent, and most preferably from about 95 to about 90 weight percent ion exchange particles.

In another preferred embodiment, the material capable of forming a hydrogel is poly(vinyl alcohol). In another preferred embodiment, the solvent is water, more preferably deionized water.

In another preferred embodiment, the conditions sufficient to form a physically crosslinked hydrogel comprise the heating and cooling of the mixture from about 1 to about 20, more preferably from about 5 to about 15, and most preferably from about 8 to about 12 times. In more specific embodiments of the invention, the mixture is cooled to a temperature of from about −60° C. to about −20° C., more preferably from about −50° C. to about −25° C., and most preferably from about −35° C. to about −30° C., and heated to a temperature of from about 25° C. to about 60° C., more preferably from about 25° C. to about 45° C., and most preferably from about 30° C. to about 35° C.

In another preferred embodiment, the mixture comprised of a solvent, ion exchange particles, and a material capable of forming a hydrogel further comprises a filler. Specific fillers include, but are not limited to, carbon black, cellulose fiber powder, siliceous fillers, polyethylene fibers and filaments, and mixtures thereof.

A third embodiment encompasses an ion exchange material formed by one of the processes of the invention.

A final embodiment encompasses a method of exchanging ions in an ionic solution which comprises passing an ionic solution through an ion exchange material which was prepared according to a process of this invention.

3.1. Definitions

As used herein, the term "ion exchange material" means an ion exchange resin, a mixture of ion exchange resins, or a material made from or comprising at least one ion exchange resin. Thus, as used herein, the term "ion exchange material" can encompass both the ion exchange resins immobilized by the processes of the invention as well as the products of the processes of the invention.

As used herein to describe a particle, the term "substantially spherical" means that the particle is spherical or that the length of its longest radius is no greater than about 2.0 times, more preferably no greater than about 1.5 times, even more preferably no greater than about 1.2 times the length of its shortest radius. When used to describe a mixture or collection of particles, the term "substantially spherical" means that greater than about 50%, more preferably greater than about 75%, even more preferably greater than about 90%, and most preferably greater than about 95% of the particles are substantially spherical.

As used herein, the term "substantial portion" means greater than about 80%, more preferably greater than about 90%, and most preferably greater than about 95%.

As used herein, the terms "degradation temperature" and "decomposition temperature" mean the temperature at which a particular chemical moiety (e.g., an ionic moiety that can be exchanged with ions in solution) decomposes. As those skilled in the art will recognize, the degradation temperature of a particular material will vary as a function of, for example, pressure and exposure to oxidants, reductants, or other reactive chemical moieties. When used to describe ion exchange resins or particles thereof, the terms "degradation temperature" and "decomposition temperature" refers to the degradation of moieties bound to the resins or particles thereof that can be exchanged with solvated ions.

As used herein, the term "substantial degradation" means the degradation of a substantial portion of the material described.

As used herein to describe an ion exchange resin, the term "high-temperature stable" means that the resin does not undergo substantial degradation at polyolefin sintering temperatures.

As used herein to describe an ion exchange resin, the term "high-temperature unstable" means that the resin is not a high-temperature stable ion exchange resin.

As used herein to describe a compound or moiety, the term "derivative" means a compound or moiety wherein the degree of saturation of at least one bond has been changed (e.g., a single bond has been changed to a double or triple bond) or wherein at least one hydrogen atom has been replaced with a different atom or with a chemical moiety. Examples of different atoms and chemical moieties include, but are not limited to, alkyl, aryl, halogen, oxygen, nitrogen, sulfur, hydroxy, methoxy, alkyl, amine, amide, ketone, and aldehyde.

As used herein to describe particles of a material, the terms "immobilize" and "immobilized" mean that when such particles are contacted with a solution, their ability or tendency to move from one physical location to another (e.g., to form channels within a column) is limited as compared to free particles unattached to a support matrix.

As used herein, the terms "matrix" and "support matrix" mean an arrangement of atoms or molecules that is solid and porous. A matrix or support matrix need not have a regular or repeating structure, and the channels and/or pores it contains need not be of the same shape or size.

As used herein, the term "ion exchange efficiency" means the efficiency with which ions in a solution are exchanged with those bound to an ion exchange material. For example, ion exchange efficiency can be defined as E/M, where E is the percent of ions in a solution that are exchanged with the ions bound to an ion exchange resin, and M is the mass of the ion exchange resin. Ion exchange efficiency can be determined by, for example, passing equal volumes of water containing equal ion concentrations through the ion exchange media being measured, and then measuring how many of the ions have been exchanged. Ion exchange can easily be determined by methods known to those skilled in the art including, but not limited to, ultraviolet and visible absorption measurements, atomic absorption spectra, and titration.

As used herein, the term "column" means a vessel or container having at least one opening, and preferably having two openings. Such a vessel or container can be of any shape or size. Thus, as used herein, the term "column" encompasses, for example, tubes, flasks, and reactors of any size and shape, including, but not limited to, small and even microscopic vessels and containers such as, but not limited to, pipette tips.

As used herein, the term "ion exchange column" means a column that contains an ion exchange material. Preferred ion exchange columns are cylinders having openings at opposing ends.

As used herein, the terms "freeze-thaw hydrogel" and "freeze-thaw crosslinked hydrogel" are used interchangeably to refer to a physically crosslinked hydrogel which has been strengthened by at least one cycle of heating and cooling.

As used herein, the term "freeze temperature" does not imply that a mixture maintained at that temperature need be in a solid phase.

As used herein, the term "thaw temperature" does not imply that a mixture maintained at that temperature need be in a liquid phase.

4. DETAILED DESCRIPTION OF THE INVENTION

This invention encompasses novel processes of immobilizing ion exchange resins, including both high-temperature unstable resins (e.g., anionic resins) and high-temperature stable resins (e.g., cationic resins), and the products of those processes. In each process of the invention, a support matrix is prepared from a support material. The support matrix, which immobilizes particles of ion exchange resin, is porous so that ionic solutions can pass through it and come in contact with the immobilized particles. The ion exchange materials of this invention (i.e., materials comprising a support matrix and ion exchange resin) provide useful and unexpected mechanical and ion exchange properties, and can be used in a wide variety of applications.

In a first process of the invention, particles of at least one high-temperature stable ion exchange resin are sintered with particles of a polyolefin. In a second process of the invention, particles of at least one ion exchange resin (high-temperature stable or unstable) are immobilized within a hydrogel.

The processes of the invention can be used to immobilize particles of any type of ion exchange resin, including those known and those not yet invented. For example, ion exchange resins can be cationic, anionic, mixtures of cation and anionic, or biologically related. Examples of ion exchange resins useful in this invention include, but are not limited to, those made of cross-linked polyvinylpyrolodone and polystyrene, and those having ion exchange functional groups such as, but not limited to, halogen ions, sulfonic acid, carboxylic acid, iminodiacetic acid, and tertiary and quaternary amines. Specific examples of cationic ion exchange resins include, but are not limited to: AMBERJET™ 1200(H); Amberlite® CG-50, IR-120(plus), IR-120 (plus) sodium form, IRC-50, IRC-50S, and IRC-718; Amberlyst® 15, 15(wet), 36(wet), A-21, A-26 borohydride, bromide, chromic acid, fluoride, and tribromide; and DOWEX® 50WX2-100, 50WX2-200, 50WX2-400, 50WX4-50, 50WX4-100, 50WX4-200, 50WX4-200R, 50WX4-400, HCR-W2, 50WX8-100, 50WX8-200, 50WX8-400, 650C, MARATHON® C, DR-2030, HCR-S, MSC-1, 88, CCR-3, MR-3, MR-3C, and Retardion®. Specific examples of anionic ion exchange resins include, but are not limited to: AMBERJET™ 4200(CI); Amberlite® IRA-67, IRA-400, IRA-400(CI), IRA-410, IRA-743, IRA-900, IRP-64, IRP-69, XAD-4, XAD-7, and XAD-16; AMBERSORB® 348F, 563, 572 and 575; DOWEX® 1X2-100, 1X2-200, 1X2-400, 1X4-50, 1X4-100, 1X4-200, 1X4-400, 1X8-50, 1X8-100, 1X8-200, 1X8-400, 21K Cl, 2X8-100, 2X8-200, 2X8-400, 22 Cl, MARATHON® A, MARATHON® A2, MSA-1, MSA-2, 550A, 66, MARATHON® WBA, and MARATHON® WGR-2; and Merrifield's peptide resins. A specific example of mixed cationic and anionic resins is Amberlite® MB-3A. Specific examples of biologically related resins that can be used in the processes and products of the invention include, but are not limited to, Sephadex® CM C-25, CM C-50, DEAE A-25, DEAE A-50, QAE A-25, QAE A-50, SP C-25, and SP C-50. These cationic, anionic, mixed cationic and anionic, and biologically related ion exchange resins are commercially available from, for example, Aldrich Chemical Co., Milwaukee, Wis., or from Rohm and Haas, Riverside, N.J. Additional examples of ion exchange resins include, but are not limited to AG-50W-X12, Bio-Rex® 70, and Chelex® 100, all of which are tradenames of Bio-Rad, Hercules, Calif. The methods of this invention, which allow the immobilization of ion exchange resins such as, but not limited to, those recited herein, are described in more detail below.

4.1. Polyolefin-Bound Ion Exchange Resins

In a first process of the invention, particles of at least one ion exchange resin are immobilized within a support matrix by sintering them with particles of at least one polyolefin. In order to maximize the ion exchange properties of the material formed by the process, the polyolefin(s) chosen to immobilize the particles of at least one ion exchange resin are preferably sinterable at temperatures less than the decomposition temperature of the at least one ion exchange resin. As described in more detail herein, it is further preferred that the polyolefin particles be substantially spherical, and even more preferred that their average size be about the same as the average size of the ion exchange particles.

The specific polyolefin or mixture of polyolefins selected to immobilize particles of an ion exchange resin or a mixture of ion exchange resins depends on the decomposition temperature of the ion exchange resin(s). Decomposition temperatures of specific resins are well known. For example, the tertiary amine functional groups of typical anionic exchange resins tend to decompose at about 100° C. to about 110° C., while the chloride functional group of typical cationic exchange resins tends to decompose at about 130° C. to about 140° C. Decomposition temperatures can also be readily determined by routine experimentation. For example, a resin can be heated to a specific temperature, after which its ion exchange efficiency can be measured. In addition, various thermal analysis methods can be used such as, but not limited to, thermal gravimetric analysis and differential scanning calorimetry.

Once the degradation temperature of an ion exchange resin is known, a polyolefin or mixture of polyolefins that can be used for its immobilization is selected. The polyolefin(s) must first be capable of being sintered. If not already known for a particular polyolefin, this can be determined from its melt flow index (MFI). Melt flow indices of individual polyolefins are known or can be readily determined by methods well known to those skilled in the art. For example, the extrusion plastometer made by Tinius Olsen Testing Machine Company, Willow Grove, Pa., can be used. The sintering temperature of the polyolefin or polyolefin mixture must also be determined. Sintering temperatures of a wide variety of polyolefins are well known or can be readily determined by routine methods such as, but not limited to, thermal mechanical analysis and dynamic mechanical thermal analysis.

Examples of polyolefins suitable for use in the invention include, but are not limited to: ethylene vinyl acetate (EVA); ethylene methyl acrylate (EMA); polyethylenes such as, but not limited to, low density polyethylene (LDPE), linear low density polyethylene (LLDPE), high density polyethylene (HDPE), and ultra-high molecular weight polyethylene (UHMWPE); polypropylenes; ethylene-propylene rubbers; ethylene-propylene-diene rubbers; and mixtures and derivatives thereof. Specific EVA materials include, but are not limited to, those in the Microthene MU® and Microthene FE® series manufactured by Equistar, Houston, Tex., such as Microthene MU 763-00 (9% vinyl acetate) and Microthene FE 532-00 (9% vinyl acetate). Specific EMA materials include, but are not limited to, those in the Optema TC® series manufactured by Exxon Chemical Company, Baton Rouge, La., such as Optema TC-110 (21.5% methyl acrylate). Specific polyethylene materials include, but are not limited to, those in the Exact® series manufactured by Exxon Chemical Company, such as Exact SLX-9090, Exact 3024, Exact, 3030, Exact 3033, Exact 4011, Exact 4041, Exact SLP-9053, Exact SLP-9072, and Exact SLP-9095. Specific examples of LDPE include, but are not limited to, those in the 20 series manufactured by DuPont Chemical Company, Wilmington, Del., such as 20 series 20, 20 series 20-6064, 20 series 2005, 20 series 2010, and 20 series 2020T. Specific examples of LLDPE include, but are not limited to, those in the Exact® series manufactured by Exxon Chemical Company, such as Exact 3022 and Exact 4006. Specific examples of HDPE include, but are not limited to, those in the Escorene HX® series manufactured by Exxon Chemical Company, such as Escorene HX-0358.

Ultra-high molecular weight polyethylenes suitable for use in the invention include, but are not limited to, UHM-WPE having a molecular weight greater than about 1,000,000. Typically, UHMWPE displays no measurable flow rate under normal test procedures. See, U.S. Pat. No. 3,954,927. Ultra-high molecular weight polyethylene also tends to have enhanced mechanical properties compared to other polyethylenes, including, but not limited to, abrasion resistance, impact resistance and toughness. Polyethylenes having weight average molecular weights of 1,000,000 or higher, which are included within the class designated as UHMWPE, typically an intrinsic viscosity in the range of about 8 or more. Specific examples of UHMWPE include, but are not limited to, Hostalen GUR® sold by Ticona Inc., League City, Tex.

Polypropylenes suitable for use in the invention include, but are not limited to: the Polyfort® series manufactured by A Shulman Co., Akron, Ohio, such as FPP 2320E, 2321E, 2322E, 2345E, PP2130, and PP2258; the Acctuf® series manufactured by BP Amoco Corporation, Atlanta, Ga., such as Acctuf 3045, Amoco 6014, and Amoco 6015; the Aristech® series manufactured by Aristech Chemical Corp., Pittsburgh, Pa., such as D-072-2, LP-230-S, and TI-4007-A; the Borealis® series manufactured by BASF Plastic Materials, Saint Paul, Minn., such as BA101E, BA110E, BA122B, BA204E, BA202E, and BA124B; the Polypro® series manufactured by Chisso America Inc., Schaumburg, Ill., such as F1177 and F3020; the Noblen® series manufactured by Mitsubishi Petrochemical Co. Ltd., Tokyo, Japan, such as MA8; the Astryn® series manufactured by Montell USA Inc., Wilmington, Del., such as 68F4-4 and PD451; the Moplen® series manufactured by Montell USA Inc., such as D 50S, D 60P, and D 78PJ; and the Pro-Fax® series manufactured by Montell USA Inc., such as 6723, 6823, and 6824.

Regardless of the specific polyolefin(s) used, it is preferred that the particles of the polyolefin be about the same size as the particles of ion exchange resin. In a preferred embodiment of the invention, the average diameter of the polyolefin particles is from about 20 $\mu$M to about 1000 $\mu$M, more preferably from about 50 $\mu$M to about 500 $\mu$M, and most preferably from about 100 $\mu$M to about 300 $\mu$M. It is also preferred that the size distribution of the polyolefin particles be narrow (e.g., as determined using commercially available screens) or approximately the same as that of the ion exchange particles. It has been found that matching the sizes of the polyolefin and ion exchange particles provides substantial benefits. For example, it results in more consistent packing of material into the mold in which the polyolefin/ion exchange resin mixture is sintered. This provides better control over the distribution of pore sizes in the material produced by the process, which in turn enables ionic solutions to flow evenly through the material. Indeed, if the sizes of the ion exchange resin and polyolefin particles differ significantly, small particles can fill interstitial sites within the support matrix and impede the free flow of ionic solutions through the ion exchange material. Uniform porosity can further ensure that no structurally weak spots exist within the ion exchange material. In view of these benefits, if a polyolefin is commercially available in powder (i.e., particulate) form, it is preferably screened prior to use to ensure a desired average size and size distribution. Most polyolefins are not, however, commercially available in powder form. Such polyolefins can be converted into powder form by methods well known to those skilled in the art such as, but not limited to, cryogenic grinding and underwater pelletizing.

Cryogenic grinding can be used to prepare polyolefin particles of a variety of different sizes. In the present invention, however, it is preferably used to prepare polyolefin particles of a relatively small size (e.g., less than about 36 $\mu$M in diameter). However, because cryogenic grinding provides little control over the sizes of the particles it produces, it is preferred that powders formed by it be screened to ensure that the particles used in the process of the invention are of a desired size and size distribution.

If the average diameter of the ion exchange particles to be immobilized is greater than about 36 $\mu$M, it is preferred that the polyolefin particles be formed by underwater pelletizing. Underwater pelletizing offers several advantages. First, it provides accurate control over the average size of the polyolefin particles produced. This allows precise and consistent matching of the particle size of the polyolefin to that of the ion exchange resin, and in many cases eliminates the need for an additional screening step and reduces the mount of wasted material. A second advantage of underwater pelletizing, which is discussed further herein, is that it allows significant control over the particles' shape.

Underwater pelletizing is described, for example, in U.S. patent application Ser. No. 09/064,786, filed Apr. 23, 1998, and U.S. provisional patent application No. 60/044,238, filed Apr. 24, 1999, both of which are incorporated herein by reference. Polyolefin particle formation using underwater pelletizing typically requires an extruder or melt pump, an underwater pelletizer, and a drier. The polyolefin resin is fed into an extruder or a melt pump and heated until semi-molten. The semi-molten material is then forced through a die. As the material emerges from the die, at least one rotating blade cuts it into particles. The rate of extrusion and the speed of the rotating blade(s) determine the shape of the particles, while the diameter of the die holes determine the average size of the particles. Water flowing over the cutting blade(s) and through the cutting chamber coagulates the cut material into particles, which are then separated from the water, dried, and expelled into a holding container.

The average size of particles produced by underwater pelletizing can be accurately controlled and can range from about 0.014" (35.6 µM) to about 0.125" (318 µM) in diameter, depending upon the polyolefin. Average particle size can be adjusted simply by changing dies, with larger bore dies yielding proportionally larger particles. The average shape of the particles can be optimized by manipulating the extrusion rate and the temperature of the water used in the process.

The shape of the polyolefin particles can affect the mechanical and ion exchange properties of materials made from them. Consequently, in another preferred embodiment of the invention, the polyolefin particles are substantially spherical. This shape provides specific benefits. First, it allows for the efficient packing of polyolefin and ion exchange particles, which also tend to be spherical. Efficient packing can provide, with a minimum of ion exchange resin, a final product with desirable ion exchange properties. Second, substantially spherical polyolefin particles, and in particular those with smooth edges, tend to sinter evenly over a well defined temperature range to provide a final product with desirable mechanical properties.

In a particularly preferred embodiment of the invention, the polyolefin particles are substantially spherical, approximately the same size as the ion exchange particles, and free of rough edges. Consequently, if the polyolefin particles are purchased commercially for use in this preferred method, they are thermal fined to ensure smooth edges and then screened to ensure a proper average size and size distribution. Thermal fining, which is well known to those skilled in the art, is a process wherein particles are rapidly mixed and optionally heated such that their rough edges become smooth. Mixers suitable for thermal fining include the W series high-intensity mixers available from Littleford Day, Inc., Florence, Ky.

Polyolefin particles made using cryogenic grinding are likewise preferably thermal fined to ensure smooth edges, and are then screened to ensure a proper average size and size distribution. Advantageously, however, if the particles are made using underwater pelletizing, which allows precise control over particle size and typically provides smooth, substantially spherical particles, subsequent thermal fining and screening need not be performed.

Once the polyolefinic support material has been processed as much as is necessary to provide particles of a desired average size and/or shape, it is combined with the ion exchange particles to be immobilized. The relative amounts of support and ion exchange components can be varied according to the desired mechanical and ion exchange properties of the final material. In general, the strength and/or stiffness of ion exchange materials formed according to this invention increase with the weight percent of the support material, while the ion exchange characteristics (e.g., number of ions available for exchange) of the final material improve with the weight percent of ion exchange resin. In a preferred embodiment of the invention, the mixture of support and ion exchange components comprises from about 5 to about 75, more preferably from about 7 to about 50, and most preferably from about 10 to about 20 weight percent support material.

Additional materials such as fillers can also be added to the mixture of support and ion exchange components. Examples of fillers include, but are not limited to, carbon black, cellulose fiber powder, siliceous fillers, polyethylene fibers and filaments, and mixtures thereof. Specific polyethylene fibers and filaments include, but are not limited to, those disclosed by U.S. Pat. Nos. 5,093,197 and 5,126,219, both of which are incorporated herein by reference.

After the polyolefin, ion exchange particles, and optional additional material(s) have been blended to ensure a uniform mixture, the mixture is sintered. Depending on the desired size and shape of the final product (e.g., a block, tube, cone, cylinder, sheet, or membrane), this can be accomplished using a mold, a belt line such as that disclosed by U.S. Pat. No. 3,405,206, which is hereby incorporated by reference, or using other techniques known to those skilled in the art. In a preferred embodiment of the invention, the mixture is sintered in a mold. Suitable molds are commercially available and are well known to those skilled in the art. A mold can also be designed such that it, or a part of it, can be used as a column in which the final ion exchange material will remain during use. In such cases, the size of the mold and material from which it is made will be dictated by the molding conditions as well as by the application to which the encased ion exchange material will be put. Specific examples of molds include, but are not limited to, flat sheets with thickness ranging from about ⅛ inch to about 0.5 inch, round cylinders of varying heights and diameters, and small conical parts molded to fit snugly into a pipette tip. Suitable mold materials include, but are not limited to, metals and alloys such as aluminum and stainless steel, high temperature thermoplastics, and other materials both known in the art and disclosed herein.

In a specific preferred embodiment of the invention, a compression mold is used to provide the sintered material. In this embodiment, the mold, which contains the mixture of ion exchange resin and support material, is heated to the sintering temperature of the support material. If the support material is EVA, for example, this temperature is approximately 100° C. After the few minutes typically required for the temperature of the mixture within the mold to equilibrate, sufficient pressure is applied to the mold to embed the ion exchange particles within the elastic matrix being formed. This pressure typically ranges from about 1 psi to about 10 psi, depending on the composition of the mixture and the desired porosity of the final product. In general, the greater the pressure applied to the mold, the smaller the average pore size and the greater the mechanical strength of the final product. The pressure is applied for any duration of time sufficient to embed the ion exchange particles within the elastic matrix. This duration, which will vary depending on the desired porosity of the final product, is typically from about 2 to about 10, more typically from about 4 to about 6 minutes.

In another embodiment of the invention, the mixture of ion exchange resin and support material is sintered in a mold without the application of pressure. In this embodiment, the mixture sintered preferably comprises from about 20 to about 70 weight percent, more preferably from about 30 to about 60 weight percent, and most preferably about 50 weight percent polyolefinic support material. Higher weight percentages of support material are typically desired in order to achieve a final product with the mechanical strength required for some applications.

Once the sintered product has been formed, the mold is allowed to cool. If pressure has been applied to the mold, the cooling can occur while it is still being applied or after the pressure has been removed. Unless the mold or part of the mold is to be used as a column or holder for the final ion exchange material, the final material is removed from the mold and optionally processed. Examples of optional processing include, but are not limited to, sterilizing, cutting, milling, polishing, encapsulating, and coating.

4.2. Hydrogel-Bound Ion Exchange Resins

In a second process of the invention, ion exchange particles are immobilized within a hydrogel. The ion exchange materials thus formed—herein referred to as "ion exchange hydrogels"—can exhibit very high ion exchange efficiencies, but tend to be mechanically weaker than polyolefin-bound ion exchange materials.

Hydrogels are polymeric materials that swell in water and retain a significant fraction of water within their structures without dissolving. Unexpectedly, it has been found that ion exchange resins can be incorporated into hydrogels to provide highly efficient ion exchange materials. The efficiency of these materials is believed to be due in part to the hydrophilic nature of the support matrix. Without being limited by theory, it is believed that hydrophobic support materials used to immobilize ion exchange particles within a matrix can adversely affect the ability of aqueous ionic solutions passed through the matrix to contact the particles. Thus, by providing a hydrophilic support matrix, the contact between an aqueous solution and immobilized ion exchange particles can be improved.

As described in more detail herein, this process comprises the formation of a mixture comprising ion exchange resin, a solvent, and a support material. In a specific embodiment of the invention, the mixture further comprises additional materials such as fillers. Specific fillers include, but are not limited to, carbon black, cellulose fiber powder, siliceous fillers, polyethylene fibers and filaments, and mixtures thereof. Once the mixture is formed, it is subjected to at least one cycle of freezing and thawing. The "freeze-thaw" process helps form the final ion exchange hydrogel.

In a first step of this process, a support material from which a hydrogel can be formed is chosen. Such materials are well known to those skilled in the art and include, but are not limited to, poly(vinyl alcohol) (PVA).

Poly(vinyl alcohol) is typically obtained as a crystalline or amorphous powder, and can vary by average molecular weight, degree of polymerization, and degree of saponificaiton (i.e., hydrolysis). Preferably, the PVA has an average molecular weight of from about 50,000 to about 500,000, more preferably from about 85,000 to about 200,000, and most preferably from about 125,000 to about 190,000. Preferably, the PVA has an average degree of polymerization of from about 1,150 to about 3,500, more preferably from about 2,000 to about 3,500, and most preferably from about 2,700 to about 3,500. Further, the PVA preferably has a degree of saponification greater than about 80%, more preferably greater than about 97%, and most preferably greater than about 99%. Poly(vinyl alcohol) is commercially available from a variety of sources. An examples of PVA that can be used in this invention is MOWIOL 20-98, sold by Clariant, Charlotte, N.C.

After the support material has been selected, it is combined with a solvent (e.g., water) to form a mixture herein referred to as a "hydrogel mixture." The particular solvent used can depend on the desired concentration of support material in the hydrogel mixture, as a support material may be more soluble in one solvent than in another. In general, a higher concentration of support material in the hydrogel mixture will provide a stronger and less permeable hydrogel.

In a preferred embodiment of the invention, the support material is PVA and the solvent is deionized water. In a more preferred embodiment, the hydrogel mixture comprises PVA and water in a ratio of from about 1:10 to about 6:10, more preferably from about 2:10 to about 4:10, and most preferably about 2:10 grams PVA to mL water.

Once the hydrogel mixture has been formed (typically with slight heating), it is combined with ion exchange resin and any optional additional material(s) by one of two methods. In one method, the ion exchange resin and optional additional material(s) is/are combined with the hydrogel mixture, after which the support material is forced into solution. In a preferred method, the support material is first forced into solution to provide a viscous hydrogel mixture which is then combined with the ion exchange resin and optional additional material(s) to yield an "ion exchange paste." Thus, in a preferred embodiment of the invention, the hydrogel mixture is placed in a sealed container and heated, optionally under pressure, until the support material has fully dissolved. The specific conditions necessary for this to occur will vary with the solvent, the support material, and its concentration. These conditions, which are well known to those skilled in the art, can readily be determined. For example, an autoclave can be used to heat the hydrogel mixture to a temperature of from about 90° C. to about 160° C., more preferably from about 100° C. to about 150° C., and most preferably from about 110° C. to about 140° C. If necessary, pressure can also be applied to force the support material into solution. Preferred pressures are from about 20 $lb/in^2$ to about 45 $lb/in^2$, more preferably from about 25 $lb/in^2$ to about 40 $lb/in^2$, and most preferably from about 30 $lb/in^2$ to about 35 $lb/in^2$. In a preferred embodiment of the invention, however, the application of pressure is not necessary, and the support material is dissolved in the solvent by simply heating the hydrogel mixture to a temperature of from about 100° C. to about 130° C. for a period of time of from about 30 to about 60 minutes.

After the support material has fully dissolved, the resulting hydrogel mixture is viscous and typically has the consistency of thick molasses when allowed to cool to below 100° C. The hot hydrogel mixture is then mixed with a known mass of dried ion exchange resin (and optional additional material(s) if so desired) until the resin is evenly incorporated into the hydrogel mixture. The resulting ion exchange paste is preferably stirred until it becomes a thick, gluey mass, at which point it is injected, poured, or otherwise transferred into a mold.

Because the ion exchange paste typically comprises high concentrations of PVA, ion exchange resin, and/or optional additional material(s), it is highly viscous even while hot. A preferred method of transferring it to a mold is thus injection molding. Injection molding allows the transfer of highly viscous mixtures while minimizing the introduction bubbles into the paste. Conventional injection molding techniques can be used. A preferred method of injection molding is vertical injection molding, wherein the hydrogel mixture is injected into the bottom of a suitable mold. In a preferred method of injection molding, an injection cylinder is driven by compressed air.

Molds used in the processes of the invention can be of any size and shape, and will typically depend on the end use of the ion exchange material. Furthermore, a mold can itself be useful in other capacities after the molding process. For example, a cylinder can be used as a mold during the molding process, and then as the column that holds the ion exchange material during its use. These and other factors affect the shape, design, and materials of the molds used in the invention.

Molds suitable for use in this embodiment of the invention can be made of any material that will not react with the ion exchange paste, that will maintain integrity over a temperature range which encompasses the freeze and thaw temperatures described herein, and, if necessary, that will allow the ion exchange hydrogel to be removed without damage. Suitable materials from which a mold can be made include, but are not limited to: natural and synthetic resins, including thermoset epoxy or polyester resins and composite resins; natural and synthetic polymers such as thermoset polyethylene and polymers based on polycarbonates, acrylates and methacrylates, chemically crosslinked PVA; glass; steel; aluminum; brass; and copper. Molds that are compliant and elastic often produce ion-exchange hydrogels with better physical properties than do molds that are stiff, as the latter can initiate bubbling and fracture during the freeze-thaw process. Annular molds can be constructed from stainless steel or Tygon or silicone tubing. Preferred annular molds are constructed from compliant, non-toxic tubing around stainless steel mandrels.

The ion exchange hydrogel is strengthened by a freeze-thaw process while in the mold. This process, referred to as "physical crosslinking," increases the crystallinity of the hydrogel, thereby increasing its stiffness and strength. A preferred embodiment of the invention comprises at least one freeze-thaw cycle wherein the temperature of the mold is decreased to a freeze temperature, held at that temperature for a specified period of time (referred to herein as the freeze time), and then heated to a thaw temperature, where it is kept for another specified period of time (referred to herein as the thaw time). This process is then repeated if desired until a hydrogel with the desired stiffness is obtained. Because the porosity (i.e., average pore size and pore density) of the hydrogel is affected by the dopant, the number of freeze-thaw cycles need not be dictated by that factor. The number of freeze-thaw cycles is preferably from about 1 to about 20, more preferably from about 5 to about 15, and most preferably from about 8 to about 12.

The freeze and thaw temperatures will depend on a number of factors such as support (e.g., PVA) concentration, ion exchange resin concentration, the concentration of optional additional materials (e.g., fillers), type of ion exchange resin, and freeze and thaw times. Preferably, the freeze temperature is from about −60° C. to about −20° C., more preferably from about −50° C. to about −35° C., and most preferably from about −35° C. to about −30° C. Preferably, the freeze time is from about 2 hours to about 12 hours, more preferably from about 3 hours to about 8 hours, and most preferably from about 4 hours to about 5 hours.

Preferably, the thaw temperature is from about 25° C. to about 60° C., more preferably from about 25° C. to about 45° C., and most preferably from about 30° C. to about 35° C. Preferably, the thaw time is from about 1 hour to about 6 hours, more preferably from about 2 hours to about 5 hours, most preferably from about 3 hours to about 4 hours.

The ion exchange hydrogel is formed upon completion of the freeze-thaw process, and can then be removed from the mold if so desired. The hydrogel can be removed at any temperature, but preferably at or below room temperature (e.g., about 25° C.). The hydrogel can then be washed and/or soaked in solvent (e.g., deionized water) to remove any impurities that may be present. If the ion exchange hydrogel is to be used in medical applications, it can also be sterilized at this time, or anytime prior to use. Suitable sterilization methods are known to those skilled in the art and include, for example, the use of radiation such as γ-ray and electron beam radiation. See, e.g., U.S. Pat. No. 5,012,503, which is incorporated herein by reference.

5. EXAMPLES

The following examples, which are representative of novel aspects of the invention, are not to be construed in any way to limit its scope.

5.1. Example 1

Preparation of Polyolefin Micropellets

Micropellets were made from H8 EFA1 EVA (MFI=1.5) supplied by Equistar Chemicals L P, Houston, Tex., using a SLC-5 LPU underwater pelletizer available from Gala Industries Inc., Winfield, W.Va. The extruder used had three thermal zones set to 150° C., 165° C., and 180° C. The underwater pelletizer was fit with a die with 0.020 inch holes drilled into it. The EVA was extruded through the die and into the cutter of the underwater pelletizer, which was rotating at 90–100 rpm to produce a material yield of approximately 15 lb/h of 0.010 inch diameter pellets.

5.2. Example 2

Preparation of Eva Bound Ion Exchange Materials

Ethylene vinyl acetate micropellets formed according to Example 1 are blended with Purlite Macronet MN 200 ion exchange resin in a 2:3 weight ratio (EVA to ion exchange resin). After the mixture is well blended, it is placed into a 0.25 inch flat mold. The mold is heated to 140° C. using a steam-heated plate for 4 minutes. Pressure is optionally applied at the end of the heating cycle. The thickness of the final product will determine the length of time it is necessary to heat the mold, which can readily be determined by those skilled in the art. After heating, the mold is cooled and the immobilized ion exchange material removed from it.

5.3. Example 3

Preparation of Hydrogel Ion Resin Paste

An ion exchange resin paste is formed using a 20% solution of MOWIOL 20-98 PVA (Clariant) by dissolving the PVA in deionized water in a 1:5 ratio by mass. The solution is created by sealing the PVA/deionized water mixture in a closed vessel and heating the mixture to 125° C. for 45 minutes. The PVA solution is removed from the heat and stirred while hot to ensure an even consistency. The solution is then gently heated to 80–90° C. for 30–60 minutes to remove any air bubbles trapped in the viscous solution. Ion exchange resin paste is made by mixing ion exchange resin into the 20% PVA solution in a 25:7 ratio of ion exchange resin to PVA solution. This formulation will yield a post processing composition that is 5 weight percent PVA with a balance of ion exchange resin.

5.4. Example 4

Hydrogel-Based Ion Exchange Micro Columns

Ion exchange resin paste prepared according to Example 3 is loaded into an injector device. This injector forces the ion exchange resin paste out of one or more orifices. The mechanism used by the injector can be air pressure, hydraulic pressure, or screw extrusion. Preferably, the injector has 96 orifices arranged in an 8 by 12 rectangle that matches the arrangement of a typical pipette tip container. All 96 pipette tips are injected with ion exchange resin paste simultaneously. The pipette tips are then sealed with a polyethylene film that is placed over the open tops of the pipette tips and heated until a seal is formed. This will prevent the PVA hydrogel binder from drying out during processing and storage. The sealed pipette tips are then subjected to no less than 2 freeze thaw cycles consisting of 4 hours freeze time at −30° C. and 2 hours thaw time at 30° C. To use the ion exchange resin pipette tip, the polyethylene film is simply peeled back to expose a row of pipette tips. A pipettor is used to draw a desired amount of solution (e.g., ionic aqueous solution) into the pipette tip.

5.5. Example 5

Hydrogel-Based Ion Exchange Columns

Medium- and large-sized ion exchange columns can be prepared by loading ion exchange resin paste prepared as according to Example 3 into an injector device. This injector forces the ion exchange resin paste out of one or more orifices. The mechanism used by the injector can be air pressure, hydraulic pressure, or screw extrusion. The ion exchange resin paste is injected into a mold. This mold could be a cavity mold or a containment vessel such as a glass or plastic cylinder that could serve as a column. The mold and ion exchange resin paste is then subjected to at least two freeze thaw cycles consisting of 4 hours freeze time at −30° C. and 2 hours thaw time at 30° C.

The embodiments of the invention described above are intended to be merely exemplary, and those skilled in the art will recognize, or will be able to ascertain using no more than routine experimentation, numerous equivalents of the specific materials, procedures, and devices described herein. All such equivalents are considered to be within the scope of the invention and are encompassed by the appended claims.

What is claimed is:

1. An ion exchange material comprising ion exchange particles sintered together with polyolefin particles, wherein the polyolefin particles are substantially spherical.

2. The material of claim 1 wherein the polyolefin particles are formed by underwater pelletizing.

3. The material of claim 1 wherein the average size of the polyolefin particles is about the same as the average size of the ion exchange particles.

4. The material of claim 1 wherein the polyolefin comprises ethylene vinyl acetate, ethylene methyl acrylate, polyethylene, polypropylene, ethylene-propylene rubber, ethylene-propylene-diene rubber, or a mixture thereof.

5. The material of claim 4 wherein the polyethylene is low density polyethylene, linear low density polyethylene, high density polyethylenes, or ultra-high molecular weight polyethylene.

6. The material of claim 5 wherein the polyolefin is ethylene vinyl acetate.

7. The material of claim 1 wherein the material comprises from about 90 to about 30 weight percent ion exchange particles.

8. The material of claim 1 wherein the mixture further comprises a filler.

9. The material of claim 8 wherein the filler is carbon black, cellulose fiber powder, siliceous filler, polyethylene fiber or filament, or a mixture thereof.

10. An ion exchange material formed by the process of sintering a mixture comprised of ion exchange and polyolefin particles, wherein the polyolefin particles are substantially spherical.

* * * * *